United States Patent [19]

Fredriksen et al.

[11] Patent Number: 5,129,867
[45] Date of Patent: Jul. 14, 1992

[54] HYDROSTATIC SPLIT-TYPE MULTI-SPEED POWER TRANSMISSION

[75] Inventors: Nils Fredriksen, Harsewinkel; Jan-Hendrik Mohr, Borken, both of Fed. Rep. of Germany

[73] Assignee: Claas oHG, Harsewinkel, Fed. Rep. of Germany

[21] Appl. No.: 725,323

[22] Filed: Jul. 8, 1991

[30] Foreign Application Priority Data

Jul. 6, 1990 [DE] Fed. Rep. of Germany ....... 4021643

[51] Int. Cl.$^5$ ............................................. F16H 47/04
[52] U.S. Cl. ...................... 475/79; 475/74; 475/218
[58] Field of Search .................. 475/72, 74, 78, 79, 475/81, 218, 219

[56] References Cited

U.S. PATENT DOCUMENTS

| 4,754,664 | 7/1988 | Dick | 475/81 |
| 4,983,149 | 1/1991 | Kita | 475/79 X |
| 5,052,987 | 10/1991 | Hagin et al. | 475/74 X |

FOREIGN PATENT DOCUMENTS

| 0195452 | 9/1986 | European Pat. Off. | 475/81 |
| 2423626 | 12/1974 | Fed. Rep. of Germany . | |
| 3041865 | 6/1982 | Fed. Rep. of Germany . | |
| 3605203 | 8/1987 | Fed. Rep. of Germany . | |
| 3815780 | 12/1988 | Fed. Rep. of Germany . | |
| WO91/01460 | 2/1991 | World Int. Prop. O. | 475/81 |

Primary Examiner—Leslie A. Braun
Assistant Examiner—William O. Trousdell
Attorney, Agent, or Firm—Browdy and Neimark

[57] ABSTRACT

A power transmision with a hydrostatically branched variable-displacement gear (HG), a two-stage epicyclic gear (I, II) and a mechanical 8-speed transmission that can be operated in forward and reverse, and with a control system (ST) that triggers the clutches (VV, VR, V0–V8) of the mechanical gear means such that for starting, the variable-displacement gear (HG) is shifted unbranched to the output shaft (ASW) and the clutches are each shifted in a load-free manner, and only on shifting up to 6th gear via the clutch (K5) of the 5th gear and on downshifting to a selectable 4th gear via the 4th-gear clutch (K4) a synchronization of the intermediate shaft (ZW) is effected. Starting and reversing are done by hydrostatically; the efficiency is high; the mechanical transmission factor is approximately 60; synchronization wear is low; and there are only two synchronizing clutches (K4, K5). In a second specifiable operating mode, the mechanical gear means is controlled in a manner free of synchronization, as a 4-speed transmission with a hydrostatic starting and reversing range.

21 Claims, 5 Drawing Sheets

HYDROSTATIC SPLIT-TYPE MULTI-SPEED POWER TRANSMISSION

The invention relates to a continuously adjustable power transmission comprising a hydrostatic-mechanical power split gear arrangement by means of a hydrostatic variable-displacement gear, a four-shaft double planetary gear and following selectable ratio gears, the power transmission further comprising an input shaft which is permanently operatively connected via a first spur gear to the variable-displacement gear and which input shaft can be coupled in a controlled manner to a planet shaft of the second of the planetary gears and to the outer wheel of the first of the planetary gears, the power transmission further comprising an output shaft of the hydrostatic variable-displacement gear which is connected via a toothed wheel stage to a sun wheel shaft, on which the two sun wheels of the planetary gears are disposed, the power transmission further comprising a planet shaft of the first planetary gear which is connectable in a controlled fashion to a first intermediate shaft, via a selectable ratio gear and an associated 3rd gear selection clutch, the power transmission further comprising an outer wheel shaft of the second planetary gear which can be coupled in a controlled fashion to the intermediate shaft via further selectable ratio gears and associated 2nd and 4th gear selection clutches, and the power transmission further comprising a transmission output shaft which can be connected to the intermediate shaft via a first group gear and an associated first group change clutch means, an which transmission output shaft further is connectable to a second intermediate shaft, via a second group gear and an associated second group change clutch means, which second intermediate shaft can be connected in a controlled fashion to the first intermediate shaft by means of a 5th gear selection clutch.

BACKGROUND OF THE INVENTION

This kind of transmission is known from German Patent Application 36 05 203 A1. It enables a continuous step-free speed ratio adjustment in all of eight selectable speed ratio gears by using a mechanical power branching by means of a double planetary gear branched to a hydrostatic adjustment mechanism. In this transmission, the shaft on which the selectable ratio gears of the first through the fourth gears act comprises intermediate shafts, which can be connected in a controlled fashion with a transmission output shaft via group gears with associated group clutches. Acceleration is done here with a friction clutch, which is subject to wear and entails energy losses, located before both the mechanical and the hydrostatic gears. The gear shift clutches are also synchronized and thus suffer wear. The clutches of the 1st through 4th gears are disposed on the hollow shafts of the planetary gear, and as a result are relatively large. There is no provision for operation of the overall transmission in reverse, which severely limits the utilization of the transmission.

German Patent Application 38 15 780 A1 also discloses a hydrostatic-mechanical, split-type transmission with four-speed selectable ratio ranges, in which an input shaft is permanently operatively connected via a first spur gear to the variable-displacement gear, and furthermore, via a selectable reversing gear, can be coupled in controlled fashion with a planet shaft of a second of the planetary gears and the outer wheel of the first of the planetary gears, and an output shaft of the hydrostatic variable-displacement gear is connected via a toothed wheel gear to a sun wheel shaft on which the two sun wheels of the two planetary gears are disposed, and a planet shaft of the first planetary gear can be connected in controlled fashion to a shaft via first selectable ratio gears by associated clutches of a 1st and a 3rd selectable gear, and an outer wheel shaft of the second planetary gear can be coupled in controlled fashion to the named shaft via further selectable ratio gears by associated clutches of a 2nd and a 4th selectable gear. This transmission produces the same degree of conversion in the forward and reverse directions, but it is limited because it has only four speed ratio ranges and so can be used only for automobiles, but not for heavy-loaded farm machinery. Moreover, the reversing gear is selectively coupled by synchronizing clutches, which are subject to wear and the synchronization of which entails an energy loss.

A hydrostatic-mechanical coupling transmission with an input-side torque split is also known, from German Patent 31 47 447, which includes two three-shaft epicyclic gears I and II, of which a differential shaft of the first epicyclic gear I and the summation shaft of the second epicyclic gear II form a unit with the driving shaft, and of which coupling transmission the second differential shaft of the first epicyclic gear I is coupled to a differential shaft of the second epicyclic gear II and is connected to the driving shaft via a hydrostatic variable-displacement gear, and of which coupling transmission finally the summation shaft of the first epicyclic gear I, on the one hand, and the second differential shaft of the second epicyclic gear II, on the other hand, can act in alternative selection via higher-stage group gears, so that by variably running through the adjusting range of the hydrostatic gear, a plurality of stepless successive adjusting ranges form the total adjusting range of the transmission, the higher-stage group gears being adapted in their speed increasing ratios such that the adjusting range change at synchronized rotational speed takes place without load and without interruption of traction force on both sides of the clutches to be coupled or decoupled, but a friction clutch is provided for acceleration. The known transmission has four forward speed ranges and one reverse gear range and is thus suitable for passenger car operation; the total conversion ratio of the transmission amounts approximately to a factor of 8, which is usually not adequate for utility vehicles.

A four-speed ratio range transmission with hydrostatic power branching is also known from German Patent Disclosure Document DE-OS 24 23 626, in which an increase in efficiency can be attained by providing that at operating points in which the driven shaft of the hydraulic converter is practically at a standstill, it is stopped toward the housing by a clutch, so that only the mechanical gear is operative, and the converter is idling, virtually without loss. It is also provided that at operating points in which the input shaft and output shaft of the hydraulic converter are in synchronism, these shafts are firmly connected to one another by a further, separate clutch, so tat the converter rotates with them with low loss, and the power is transmitted purely mechanically.

SUMMARY OF THE INVENTION

The object of the invention is to improve the hydraulically-mechanically adjustable coupling transmission described in the first paragraph so that the total conversion in the transmission is available in both travel directions, the number of synchronizing clutches is reduced, and the total conversion is increased by a purely hydraulic transmitted power in an acceleration range.

This object is attained in that the second intermediate shaft can be connected via a 1st-selectable-gear by a separately controllable 1st-gear clutch;

that the input shaft can be connected via a selectable reversing gear to the planet shaft;

that an intermediate gear operatively connected to the sun wheel shaft is coupleable in a controlled fashion to the intermediate shaft in an acceleration transmission range, via a separately controllable zero-gear clutch; and that only the shift clutches of the 4th and the 5th gears have synchronizing devices, and all the other clutches of the reversing gear, of the selectable ratio gears and of the group gear shift clutches are embodied as simple claw clutches, and that by means of a control apparatus as a function of signals of operating elements, whenever leaving the stopped position of the output shaft is commanded, the 0 gear, the 1st gear and the 5th gear clutch are engaged, and as a function of the position of a group selection switch one of the group gear clutches is switched on and an adjustment of the hydraulic converter takes place in a manner controlled as commanded, and a transition to a hydrostatic-mechanical split-power operating state is established as applicable when there is rotational speed equality between the clutch elements to be actuated of the reversing gear, as a function of the position signal of an up-down counter, by means of engaging the forward clutch or the reverse clutch, and that in the event the clutch of the lower gear group circuit is actuated, the single 1st gear clutch remains selected until a transition to the 6th gear took place.

The novel transmission and circuit arrangement makes it advantageously possible, when the power output is at a standstill, to close the clutches necessary for startup, which clutches do not undergo wear, and via the hydrostatic variable-displacement gear to accelerate the power output selectively and continuously for starting forward or backward, and to reverse it; this makes it possible to dispense with a starting clutch that entails wear and loss.

Another advantageous feature makes it possible as needed, without having to run through the slow group speed, to selectively accelerate continuously forward or backward from a standstill of the power output directly, with suitable clutches selected without wear, and to reverse this, as a result of which fast, comfortable starting at low load is brought about, and numerous energy-consuming and wear-causing adjustment and clutch coupling and decoupling processes in the lower speeds can be dispensed with.

In the starting phase or in other words in the so-called zero gear, as a result of the disposition of the hollow shaft on the intermediate shaft, of the suitable selection of the associated clutches, and of an advantageous switching logic of the transmission control, the input shaft of the double planetary set I/II is driven such that it is directed "in reverse" in the load-free state, as far backwards as the input-side reversing gear, so that by design and by the disposition of the reversing gear in the mechanical power-branching train, rotational speed equality of the two elements to be coupled prevails upon attainment of maximum adjustment of the hydrostatic adjusting unit, for the forward or reverse travel direction respectively, at the coupling point of the forward or reverse clutch of the reversing gear, and here, depending on the position of the group gear clutches, shifting to the 1st or 5th gear is done with low friction loss at rotational speed equality. As a result of this advantageous embodiment, the use of wear- and loss-producing synchronizing clutches for the turning gear is unnecessary. High rotational speed differences in the known transmissions, combined with the considerable rotary masses at the reversal of rotational direction of the components to be synchronized, require large, strong synchronizing clutches of the turning gear, which take up a great deal of space and entail high costs. Thus according to the invention small, low-loss claw clutches can be used for this purpose. The transition between the high-ratio, slow group speed and the low-ratio, fast group speed can advantageously be established by simple claw clutches at the transmission output shaft, since by means of a suitable selection of the course of coupling at the instant of coupling, rotational speed equality prevails on both sides of the applicable clutches. Loss from synchronizing work does not occur at this group transition.

As a result of this provision, the number of system-dictated synchronizing clutches required, which enable continuous passage through the two groups of speeds without interruption by traction, is reduced to a minimum number, namely two. These two synchronizing clutches, in the shifting processes for 5th gear, specifically one upon shifting upward and the other for shifting downward, perform the necessary preparatory synchronizing work, always in the load-free state, or in other words with low loss.

This embodiment of the transmission thus produces eight continuously adjustable driving ranges both forward and in reverse, and all the transitions from one driving range to another can be shifted under load, and the drive power is of the split-power type; that is, it flows through the transmission partly hydrostatically and partly mechanically. In addition to the eight gear speed ranges, there is the so-called 0 gear range, which effects startup from a standstill and reversing, and in which the power flows solely in hydrostatic form through the transmission.

The full reversibility of the conversion advantageously makes it possible to use the transmission in transportation and work equipment in which a turning of the equipment to reverse the direction of travel becomes unnecessary. Examples are logging and construction vehicles and agricultural vehicles with a rotatable driver's seat and a reverse travel apparatus, or in other words so-called two-way tracks.

With a structurally advantageous selection of the planetary set speed transformation ratios of $i_{IO} = -4.0$ and $i_{IIO} = -3.0$, this transmission design results in a maximum required hydrostatic power component of 33%—with respect to the maximum transmissible power—and a total torque and speed increase conversion in the power-split driving state of approximately 1:60, distributed over the eight speed ranges, which have an individual conversion of 1:1.667.

As a result of this kind of slight maximally occurring hydrostatic power component, good total efficiency is attained.

BRIEF DESCRIPTION OF THE DRAWINGS

The apparatus will now be described in conjunction with FIGS. 1-5.

DESCRIPTION OF THE PREFERRED EMBODIMENTS

Figure 1:
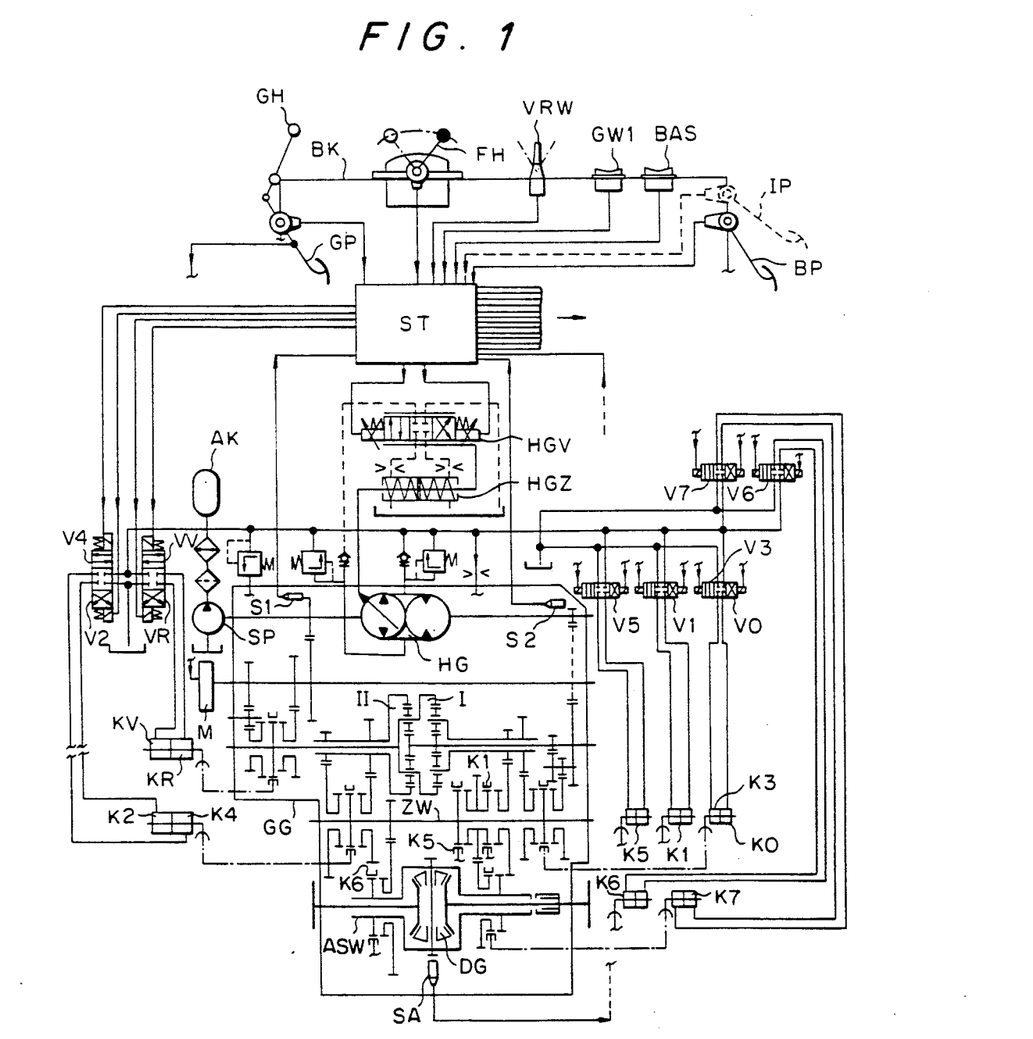
FIG. 1 is a schematic overview diagram.

FIG. 1 is a schematic overview of a transmission arrangement and the control apparatus (ST) with the operating elements and control members. The operating elements are disposed in a control compartment (BK), of which a gas pedal (GP) and a manual gas level (GH) act directly on the Diesel engine (M). Their position is also reported on the input side to the electronic control system (ST). A drive lever (FH), which for instance dictates the desired travel speed, a forward-reverse selection lever (VRW), a transmission group selection switch (GW1), an operating mode selection switch (BAS), and an inch pedal (IP) and a brake pedal (BP) are also connected on the input side to the control system (ST). This system evaluates the signals of these operating elements, under program control in a suitable manner, and on the output side produces adjusting signals with which electromagnetically controlled hydraulic valves (VV, VR, V0-V7), which engage and disengage the transmission clutches (KV, KR, K0-K7) with the aid of suitable hydraulic adjusting cylinders and associated selector forks, are acted upon. The hydraulic valves (VV, VR; V0, V3; V2, V4) can each be embodied in pairs and have a neutral position, so that clutches that preclude one another (KV, KR, K2, K4; K0, K3) can be connected to an associated cylinder pair and as a result can be brought into a neutral position and from there can be selectively coupled to one or another transmission wheel.

Associated with the hydraulic variable-displacement gear (HG) on the input and output side are rotary speed sensors (S1, S2), and another rotary speed sensor (SA) is disposed on the output shaft (ASW), which is a summation shaft of the output-side differential gear (DG). All the clutch adjusting cylinders are also each equipped with a position sensor, not shown in FIG. 1. The signals of these sensors are supplied to the electronic control system (ST), and there they are evaluated, so that at a specified gear ratio between the input and output rotational speed and at rotational ratio equality on both sides of the clutch to be selected anew at a given time, a controlled speed ratio change, i.e. gear change, takes place by means of an up- or down-shifting valve-clutch actuation depending on the position of the operating elements. The control system (ST) also controls a hydraulic control valve (HGV), which acts upon a proportional-action hydraulic control cylinder (HGZ), which controls the hydrostatic variable-displacement gear (HG). Once a given speed or gear is reached, the control system (ST) forms one control loop each with the control valve (HGV), the variable-displacement gear (HG) and the associated rotational speed sensor (S1, S2, SA).

All the spur gears, both epicyclic gears I, II, the differential gear (DG) and the variable-displacement gear (HG), with the clutches and their adjusting cylinders, are accommodated in compact form in a gearbox (GG). A feedpump (SP) is disposed on the input shaft, so that a quantity of control and filling oil is furnished continuously for the valves and actuator. Devices for oil filtering and oil cooling can advantageously be disposed in the feed circuit. An oil reservoir (AK), at the instant of gear shifting, assures an adequate quantity of oil at an adequate coupling pressure.

Figure 2:
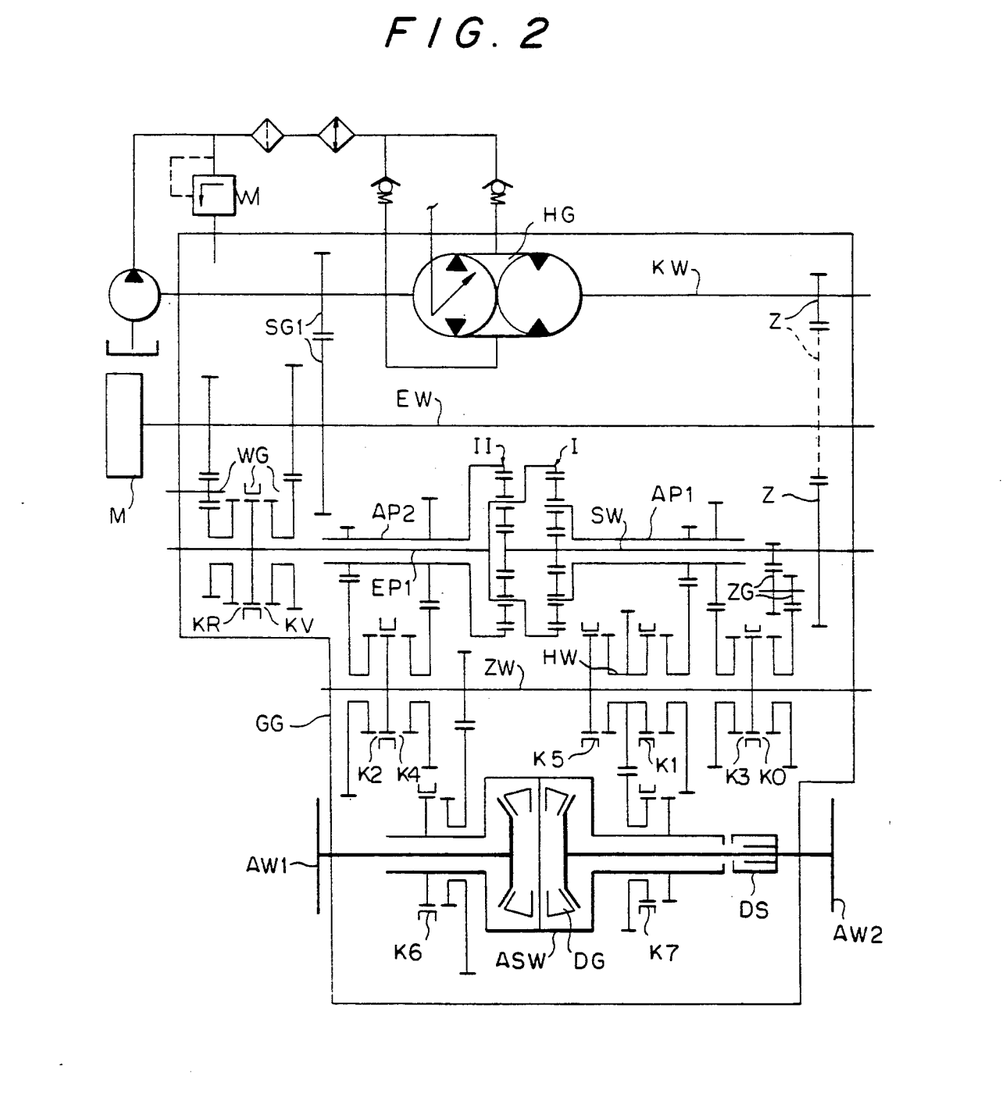
FIG. 2 shows the transmission layout.

FIG. 2 shows the gearbox (GG) with its essential transmission units on a larger scale than in the overview figure. From the engine (M), the input shaft (EW) is driven, which is connected, by a reversing gear (WG) and via a first spur gear (SG1), to the input shaft of the adjusting unit of the hydrostatic variable-displacement gear (HG). On the power output, i.e. the driving, side, the turning gear (WG) is connected via an input shaft (EP1), to the planet wheel carrying rib of the second epicyclic gear (II) and to the outer wheel of the first epicyclic gear (I).

The hydrostatic gear (HG) suitably comprises one adjusting unit and one constant unit (HR), in an axial piston kind of construction. It is disposed in a compact back-to-back arrangement in the gearbox (GG).

The output shaft (KW) of the constant unit (HG) is operatively connected via a toothed wheel gear (Z) to the sun wheel shafts (SW) of the epicyclic gears (I, II). This sun wheel shaft (SW) can also be coupled to an intermediate shaft (ZW), via an intermediate gear (ZG) having an associated clutch (K0).

The two output shafts (AP1, AP2) of the epicyclic gears (I, II), one of which is connected to the planet wheel carrying rib of the first epicyclic gear (I) and the other of which is connected to the outer wheel of the second epicyclic gear (II), and which are embodied as hollow shafts and are rotatably supported on the sun wheel shaft (SW) and on the input shaft (EP1) of the epicyclic gear, respectively, each drive two spur gears of the gear circuits, which on the other hand are connected in coupleable fashion to the intermediate shaft (ZW). Three of the clutches (K2, K3, K4) each establish a direct connection with the intermediate shaft (ZW), and the fourth coupling can be established via a hollow shaft (HW) by the closure of two clutches (K1, K5).

From the intermediate shaft (ZW) or from the hollow shaft (HW), via one group spur gear and associated group clutches (K6, K7, respectively), the driven summation shaft (ASW) of the output-side differential gear (DG) can be drivable with its output shafts (AW1, AW2). One of the group clutches (K6) couples the group gear for the four slowest speeds, and to this end directly establishes an operative connection between the intermediate shaft (ZW) and the output shaft (ASW) The other of the group clutches (K7) couples the group gear of the four fastest speeds, and thus brings about the connection between the hollow shaft (HW) and the output shaft (ASW). The differential gear (DG) can suitably also be provided with a controllably actuatable differential lock (DS).

TABLE 1

| Gear [*] | V/R | Clutches selected, 8-speed mode | | | | | | | |
|---|---|---|---|---|---|---|---|---|---|
| | | K0 | K1 | K2 | K3 | K4 | K5 | K6 | K7 |
| shifting upward | | | | | | | | | |
| 0 | | X | X | | | | X | X | |
| 1 | X | | X | | | | X | X | |
| 2 | X | | X | X | | | | X | |
| 3 | X | | X | | X | | | X | |
| 4 | X | | X | | | X | | X | |
| 5 | X | | X | | | A | E | | X |
| 6 | X | | | X | | | X | | X |
| 7 | X | | | | X | | X | | X |
| 8 | X | | | | | X | X | | X |
| shifting downward | | | | | | | | | |
| 8 | X | | | | | X | X | | X |
| 7 | X | | | | X | | X | | X |
| 6 | X | | | X | | | X | | X |
| 5 | X | | X | (A1) | | E | A | | X |
| 4 | X | | X | | | X | | X | |
| 3 | X | | X | | X | | | X | |
| 2 | X | | X | X | | | | X | |
| 1 | X | | X | | | | X | X | |
| 0 | | X | X | | | | X | X | |

\* = forward/reverse
[A = disengagement; E = engagement of clutches]

The shifting diagram for the speed ranges in the 8-speed mode and the associated clutch actuations are shown in table 1. The numerals following K for the clutch designations, for most gear changes, point to the clutch essential for the particular gear or the speed. The clutches, which are designated V, R, K0, K1, K2, K3, K6 and K7 are simple toothed claw clutches, since the same rotational speed prevails on both sides of them at the time of coupling. Only the clutches (K4) for the 4th gear and the auxiliary clutch (K5) are synchronized clutches and perform synchronizing work. They should each be shifted in a sequence such that upon shifting upward in the course of the 5th gear, a load-free disengagement (A) of the clutch (K4) for the 4th gear occurs first, and then a load-free preparatory and synchronizing engagement (E) of the 5th gear clutch (K5) is performed, and such that on shifting downward in the course of the 5th gear, a load-free disengagement (A) of the 5th gear clutch (K5) and then the load-free preparatory and synchronizing engagement (E) of the 4th gear clutch (K4) are performed.

With the 5th gear clutch (K5), which is accordingly operated as an auxiliary clutch, the hollow shaft (HW) and thus the fast group gear, which in proportion to the slow group gear has a transmission ratio that corresponds to the adjusting ratio of the specified four-speed transmission, can be brought selectively into operative connection with the intermediate shaft (ZW).

Since the drive power in 5th gear with the auxiliary clutch (K5) disengaged is transmitted directly via the hollow shaft (HW), the load-free intermediate shaft (ZW) is advantageously synchronized in the course of this gear synchronized, upon shifting upward by means of one synchronizing auxiliary clutch (K5) and upon shifting downward by the other synchronizing clutch (K4), at the suitable time, as described above, to the rotational speeds for the 6th and the 4th gears, respectively, to prepare for the process of coupling to these 6th and 4th gears.

As a result, it is assured that the specified four-speed mode is run through twice, avoiding an interruption of traction, at the transition from the slow gear group to the fast gear group, and vice versa.

Advantageous minimizing of the necessary synchronizing work of one synchronizing auxiliary clutch (K5) upon shifting upward and of the other synchronizing clutch (K4) upon shifting downward is advantageously attained by the provision that, in terms of the course of shifting, these clutches (K4, K5) that in 5th gear do not transmit power for the previous 4th and 6th gears, respectively, are disengaged as late as possible, yet before the engagement of the respectively associated synchronizing clutch (K5, K4) for the sake of approximating rotational speed.

Synchronization upon shifting downward by disengagement of a clutch at the appropriate time can alternatively be done by means of the disengagement process, shown at reference (A1) in the table, of the 2nd gear clutch (K2). The four-speed operating mode, in which the fast group speed is already selected at a standstill, and after the zero gear only the four top speeds are used, takes place completely without synchronization, since no transition between the group speeds takes place. The shifting diagram for the four-speed mode is given in table 2.

TABLE 2

| Gear [*] | V/R | Clutches selected, 4-speed mode | | | | | | | |
|---|---|---|---|---|---|---|---|---|---|
| | | K0 | K1 | K2 | K3 | K4 | K5 | K6 | K7 |
| shifting upward | | | | | | | | | |
| 0 | | X | X | | | | | X | X |
| 5 | X | | X | | | | | X | X |
| 6 | X | | | X | | | | X | X |
| 7 | X | | | | X | | | X | X |
| 8 | X | | | | | X | | X | X |
| shifting downward | | | | | | | | | |
| 8 | X | | | | | X | | X | X |
| 7 | X | | | | X | | | X | X |
| 6 | X | | | X | | | | X | X |
| 5 | X | | X | | | | | X | X |
| 0 | | X | X | | | | | X | X |

\* = forward/reverse

For an exemplary design of the novel transmission, the specified rotational speeds of the shaft (KW) of the hydrostatic constant unit (HG), at which shifting upward or downward should be done, are shown in table 3, in each case for rotational speed equality at the clutches to be selected and for an assumed constant input rotational speed of ne=2200 rpm.

TABLE 3

| Speed change | Clutches | | rpm nHG |
|---|---|---|---|
| | E | A | |
| Forward: | | | |
| 0–1 | V | K0 | 4882.394 |
| 1–2 | K2 | K5 | 4853.333 |
| 2–3 | K3 | K2 | 4853.333 |
| 3–4 | K4 | K3 | 4853.333 |
| 4–5 | K7 | K6 | 4811.352 |
| | K5 | K4 | |
| 5–6 | K2 | K1 | 4853.333 |
| 6–7 | K3 | K2 | 4853.333 |
| 7–8 | K4 | K3 | 4853.333 |
| Backward: | | | |
| 0–1 | R | K0 | 4795.209 |
| 1–2 | K2 | K5 | 4766.667 |
| 2–3 | K3 | K2 | 4766.667 |
| 3–4 | K4 | K3 | 4766.667 |
| 4–5 | K7 | K6 | 4725.436 |
| | K5 | K4 | |
| 5–6 | K2 | K1 | 4766.667 |
| 6–7 | K3 | K2 | 4766.667 |
| 7–8 | K4 | K3 | 4766.667 |

The output rotational speed and the input rotational speed of the hydrostatic variable-displacement gear (HG) are ascertained with the rotational speed sensors (S2, S1) in FIG. 1. In the control system (ST), a ratio is formed continuously from the output signal of the sensors and is compared continuously with the indicated ratio at which an rotational speed equality at the clutch parts prevails. When this ratio is attained, the shifting condition exists, and a shifting process is tripped, as long as a speed change continues to be called for.

Good total efficiency of the transmission is assured by low hydrostatic power components. By means of an advantageous selection of the static ratio of the planetary sets, the hydrostatic power components and the individual adjusting ratio and individual conversion are defined. In the exemplary design the relative hydrostatic power component, in other words the power that flows through the hydrostatic variable-displacement gear at the terminal settings is advantageously only between −33% and +20% with respect to the total power of the transmission.

Figure 3:
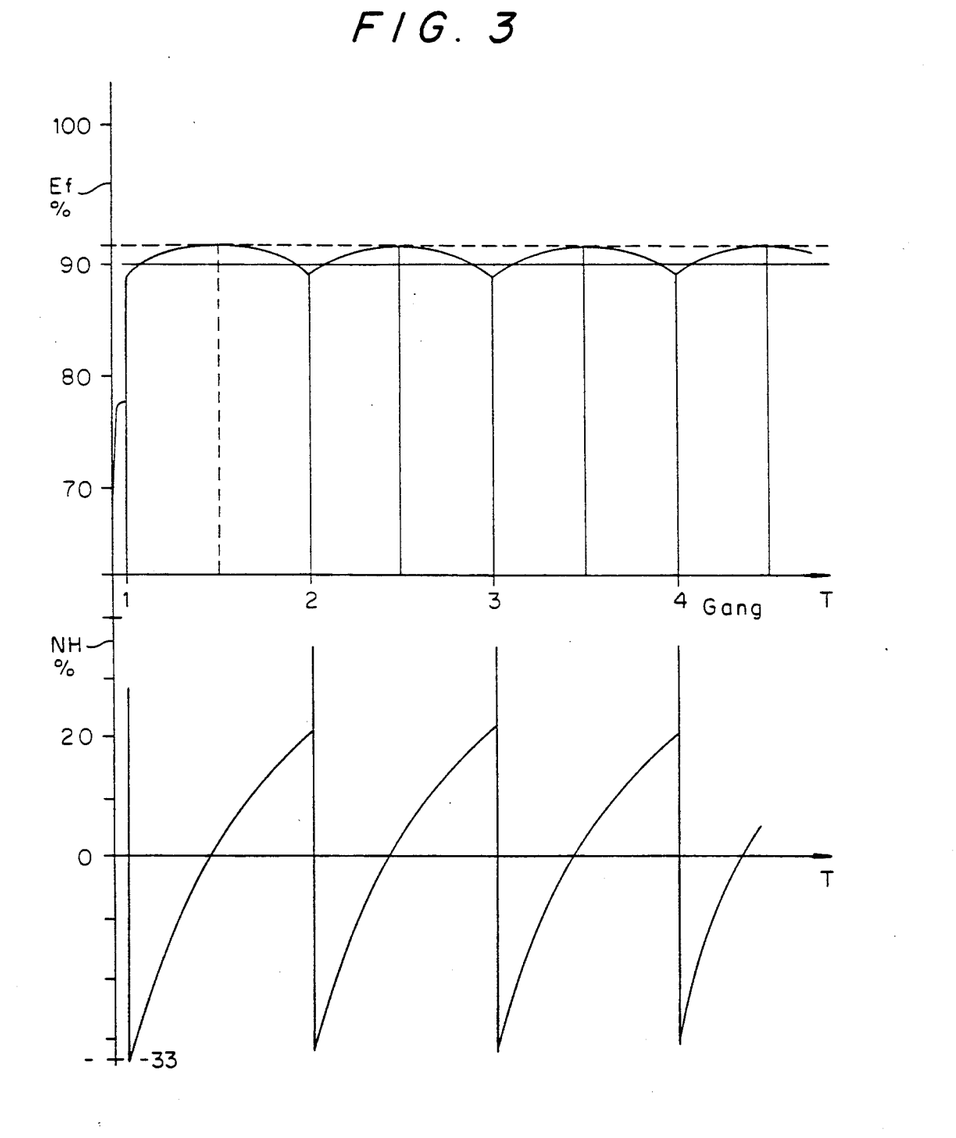
FIG. 3 shows the total efficiency and the relative hydrostatic power component as a function of the various speeds and of the branching.

FIG. 3 shows the course of the hydrostatic power components (NH) and the efficiency (Ef) of the total transmission as a function of the mechanical gears selected. The efficiency figures are the lowest where the hydrostatic power components are the highest, and are the highest where no hydrostatic power is required, in other words at NH=0.

A suitable transmission design for a traction vehicle, in combination with a suitable axle ratio and tire design produces vehicle speeds in accordance with table 4.

TABLE 4

| Gear | Drive type | Vehicle speeds (km/h) | | |
|---|---|---|---|---|
| | | beginning | middle | end |
| 0 | fully hydrostatic | −0.84 | 0 | 0.84 |
| 1 | power-split | 0.84 | 1.12 | 1.39 |
| 2 | " | 1.39 | 1.86 | 2.32 |
| 3 | " | 2.32 | 3.10 | 3.87 |
| 4 | " | 3.87 | 5.16 | 6.45 |
| 5 | " | 6.45 | 8.60 | 10.75 |
| 6 | " | 10.75 | 14.3 | 17.9 |
| 7 | " | 17.9 | 23.9 | 29.9 |
| 8 | " | 29.9 | 39.9 | 49.8 |

Figure 4:
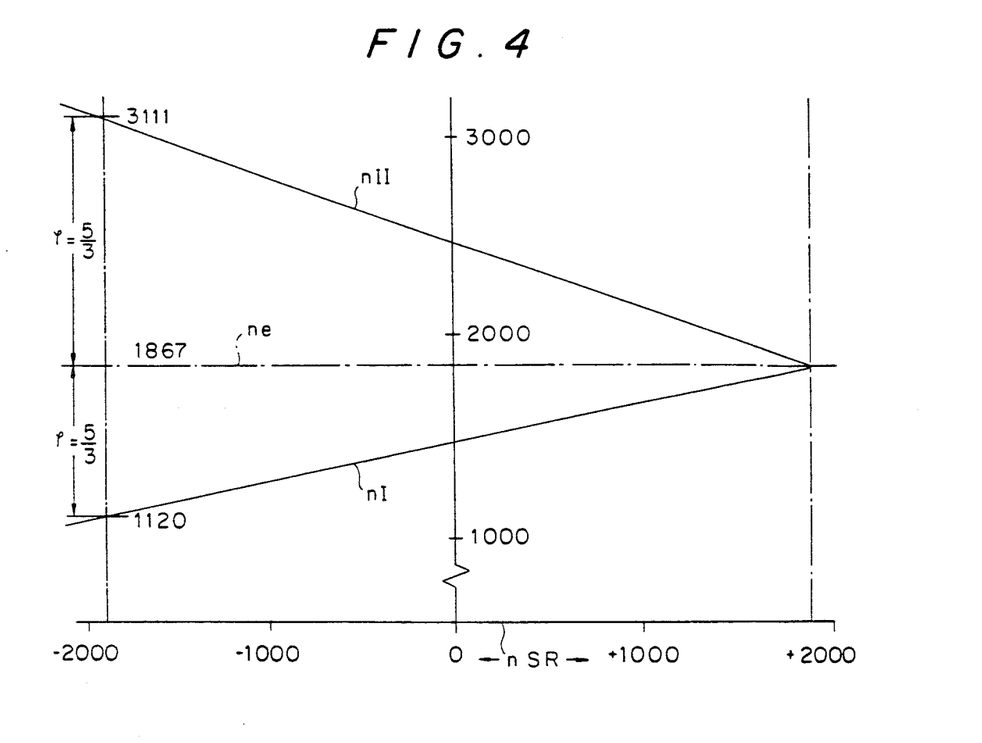
FIG. 4 shows the courses of rotational speed of the planetary set shafts.
Figure 4A:
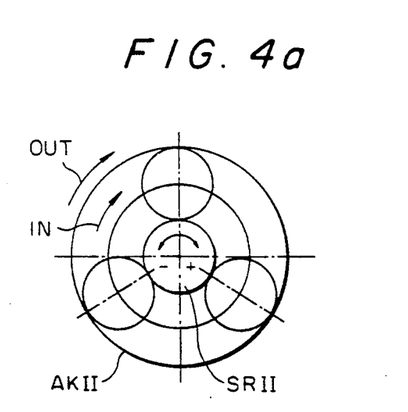
Figure 4B:
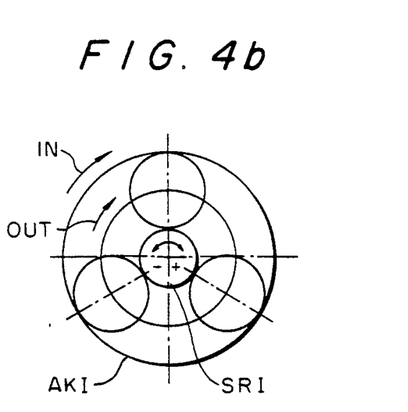

At the ratios in the example give, FIG. 4 shows the course of rotational speed in the epicyclic gears (I, II); the sun wheel rotational speed (nSR) is plotted on the abscissa, and the planetary set output rotational speeds (nI, nII) are plotted on the ordinate, at a constant input rotational speed ne=1867 rpm.

The static ratios of the planetary sets I and II, in other words the rotational speed ratios of the sun wheels (SRI, SRII) to the associated outer wheels (AKI, AKII) are defined at −4.0 and −3.0, resulting in the individual adjusting ratio of the transmission of 5/3 and in the above-given hydrostatic power components.

The ratios of the 1st and the 2nd gears and of the 3rd and the 4th gears are equal in each case, and the transition from the 2nd to the 3rd gear is taken into account by the factor in accordance with the second power of the individual adjusting ratio. Similarly, the ratio in the 0 gear is lower by the factor of the adjusting ratio, than that for the 1st and the 2nd gear.

As can be seen from tables 1 and 2 and FIG. 2, in the 8-speed and 4-speed mode at a standstill, upon startup and reversing in the 0 gear, four clutches at a time (K0, K1, K5, K6; K0, K1, K5, K7) are engaged. The reversing clutches (KV, KR) are totally in the 0 gear in their neutral position. The reversing gear and the double planetary gear transmit no power. The total power in this gear is transmitted fully hydrostatically. The quality of startup and reversal can thus be considered equivalent to the high quality of the startup and reversal of a self-propelled working vehicle, such as a harvester, with a hydrostatic traveling gear.

Since the clutch (K1) of the first power-split speed range is already engaged at a standstill, the components that do not carry power, including those of the reversing clutch (KR, KV) are rotated as well, as a result of which the shift to the power-split mode should be performed at the end of the starting range of the zero gear, namely at the end of the adjusting range of the hydrostatic variable-displacement gear (HG), when there is rotational speed equality at the turning clutch (KV, KR). A synchronizing apparatus is therefore not required for this clutch. At the end of the startup phase in the 0 gear, the clutch K0 of the 0 gear is then disengaged after engagement of the reversing clutch (KV, KR), whereupon the 1st gear becomes operative and the transition to the power split takes place.

For further upward shifting, the hydrostatic gear (HG) is switched through to the opposite extreme position in each case, and then, at rotational speed equality at the clutch (K2) of the 2nd gear, its engagement takes place, after which the clutch (K5) can be disengaged in a load-free fashion. The clutch (K1) for the 1st gear is advantageously embodied as a single clutch and is still kept engaged with respect to the transition of the fast speed group. Correspondingly, the switchovers for the 3rd and the 4th gear are carried out at rotational speed equality at the associated clutches (K3, K4).

At the transition to the 5th gear, the speed group clutch (K7) of the fast speed group can be engaged in a load-free manner, and subsequently the clutch (K6) of the lower speed group can be disengaged in a load-free manner, since the clutch (K1) for 1st gear is still engaged and drives the fast group stage in a load-free fashion via the hollow shaft (HW). Since rotational speed equality prevails for these clutches (K6, K7) of the speed groups in each case upon engagement and disengagement, no synchronizing means are required for them, either.

Since the load in the 5th gear is transmitted via the hollow shaft (HW), the intermediate shaft (ZW) is load-free and can be synchronized and engaged for preparation for the switchover to the 6th gear by means of the clutch (K5) of the 5th gear; in this process the clutch (K4) of the 4th gear is not disengaged until immediately beforehand. The 6th gear is reached by engaging the clutch (K2) for the 2nd and the 6th gear and by disengaging the clutch (K1) for the 1st and the 5th gear, again under a condition of rotational speed equality. The 7th and 8th gears are reached, with the auxiliary clutch (K5) engaged, by shifting the associated clutches (K3, K4) of the 3rd and the 7th gears and of the 4th and the 8th gears, respectively, when the respective terminal positions of the adjustable drive are reached.

Shifting downward is generally done analogously; to prepare for a speed change from the 5th to the 4th gear, or in other words in the course of the 5th gear, the load-free intermediate shaft (ZW) is synchronized by the 4th gear clutch (K4), and the 5th gear clutch (K5) is disengaged, in each case just briefly beforehand. The synchronizing processes are each initiated in approximately the middle position of the variable displacement gear.

In the electronic control system of the transmission, a plurality of types of operating mode are advantageously provided that can be selected by an operating mode switch (BAS).

In a first selectable operating mode, the gear selection up to a suitable gear is carried out fully electronically, similarly as it is the case in a fully hydrostatically driven vehicle by means of the drive lever, the position of which specifies the power output takeoff rotational speed. The engine rotational speed can be specified to be constant or can be selected freely as system is especially well-suited for situations in which secondary drive mechanisms are used independently of the traveling gear.

In a second selectable operating mode, the transmission is regulated as a function of the operating state of the driving engine, and a vehicle driven thereby can be driven in a controlled manner only with the aid of the gas pedal, which communicates with the control system via the position sensor. A gas pedal position potentiometer furnishes a set-point signal, as a function of the gas pedal position, to the electronic control unit.

This variable set-point signal is associated, in accordance with previously defined characteristic curves of the engine performance graph that are stored in the control unit, with a certain set-point rpm of the driving engine, and forming a closed control loop, the set point signal is compared with the actual signal of the rotational speed sensor (S1) of the driving motor, and the gained differential signal from the comparator serves as a command signal for the transmission setting.

Arbitrary parameterized characteristic curves of the engine performance graph, preferably those for minimum fuel consumption, can be stored in memory and used for ascertaining the set-point rotational speed. If there are deviations within given limit values for the set-point and actual signals, differences which may be dictated by changes in traction, then the speed increasing ratio of the transmission is varied, by adjustment of the hydrostatic variable-displacement gear, such that the actual and set-point signals become equal in accordance with the characteristic curve selected. This type of regulation is advantageous both in the partial-load range, for instance with driving with minimum fuel consumption, and in full-load range, such as for heavy pulling work, for the sake of steady, load-independent exploitation of the maximum engine output. To avoid overly frequency clutch engagement procedures, a hysteresis threshold for the transmission range transitions is provided.

A third selectable operating mode produces a constant speed regulation, namely a regulation of the driven shaft of the transmission in accordance with an rotational speed that can be specified by the driver with the aid of the drive pedal, largely independently of any particular transmission load and of the input rotational speed of the transmission indicated by the driving engine.

In a fourth selectable operating mode, instead of regulating the speed increasing ratio of the transmission to an arbitrarily specified speed increasing ratio in the entire possible conversion range, a regulated operation tending to the middle position of the hydrostatic variable-displacement gear, or in other words tending to the most favorable efficiency, is effected, specifically in such a way that within a chosen speed, ratio gear, specified by the drive lever, an automatic speed ratio change is given by adjusting the hydrostatic adjusting unit to its neutral position. This fourth operating mode is advantageously selected by the driver, with the aid of an electric key mounted on the drive lever (FH).

The speed specification by the drive lever is decreased in an oversteering manner upon actuation of the inch pedal and/or brake pedal, so that in accordance with the lesser specified speed, a downward adjustment and downshifting occurs, in each case during a pedal actuation, to the point of a standstill. If the pedals are released again, then the speed specification takes place in accordance with the position of the drive lever, along with an attendant shifting and adjustment by the control system.

The transmission can also be used without the differential gear on the output side, and a power takeoff gear can practically be provided on the driving shaft extending through the transmission.

The fourth operating mode already described, with a transmission regulation that in each case leads to the middle position of the hydrostatic variable-displacement gear in the various speeds, produces the best transmission efficiency, because the hydrostatic power flow in this case is equal to zero. The hydrostatic power loss, however, is not equal to zero, because the sun wheel which is stopped, exerts a reinforcing moment upon the hydrostatic variable-displacement gear, which leads to a corresponding pressure in the hydrostatic circuit of the variable-displacement gear. Pressure-dictated losses in terms of oil leakage of the variable-displacement gear are brought to bear by the hydrostatic adjusting unit and thus have the effect of reducing efficiency in the overall power of the transmission.

Figure 5:
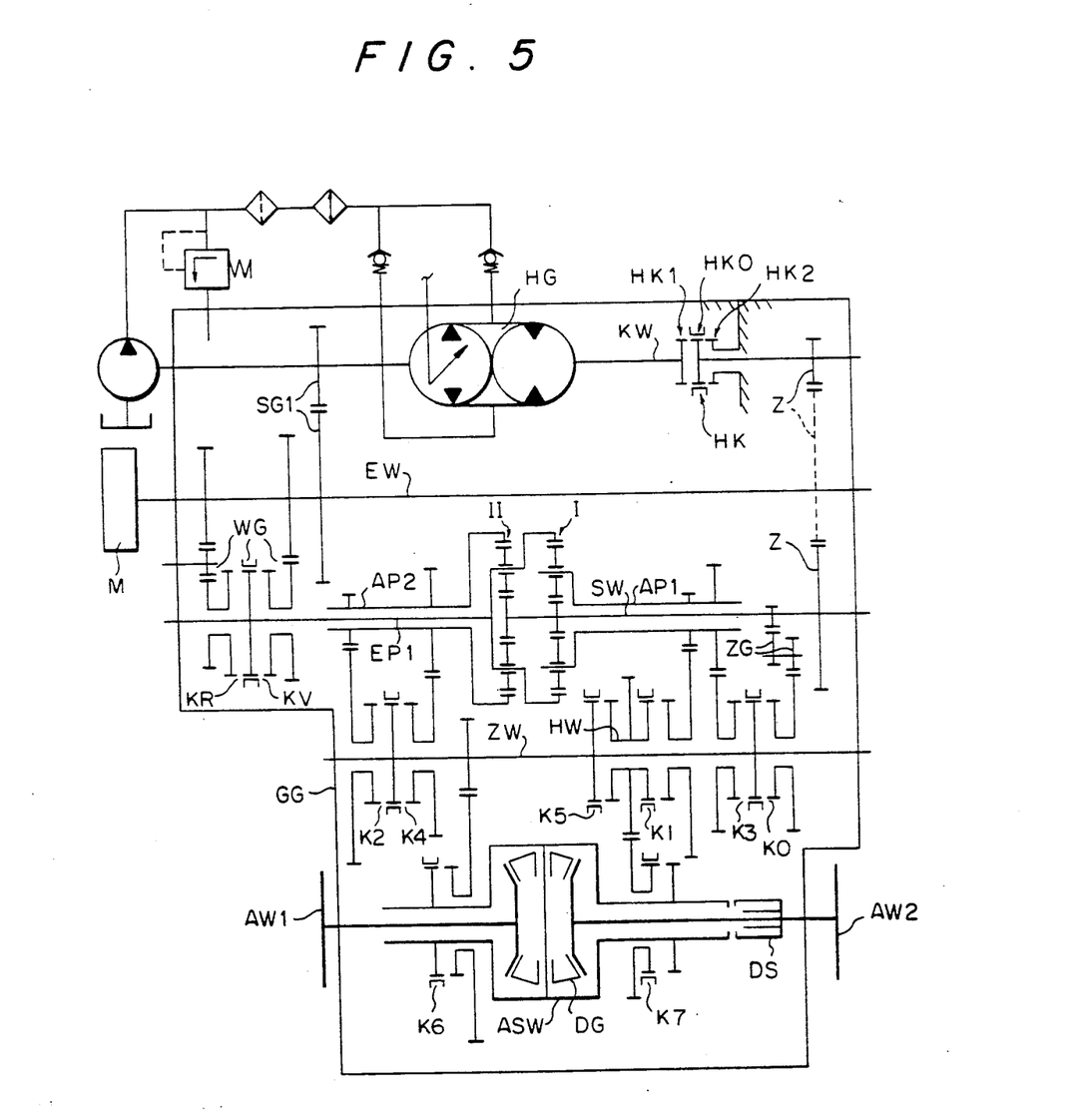
FIG. 5 is a transmission diagram of a further version of the transmission.

In another advantageous embodiment of the transmission of FIG. 5, this disadvantage is eliminated by introducing a further auxiliary clutch (HK), which is disposed on the output shaft of the hydrostatic variable-displacement gear (HG). This auxiliary clutch (HK), which is activated precisely like the other clutches of the transmission by means of a hydraulic actuator and electrohydraulic shifting valves and is connected to the electronic control unit (FT), has three shifting positions:

In a normal position (HK1), the operative connection between the variable-displacement gear (HG) and the sun wheel shaft (SW) is kept in force via the toothed wheel gear (Z).

In a second shifting position (HK2), the operative connection between the variable-displacement gear (HG) and the sun wheel shaft (SW) is interrupted, and at the same time the sun wheel shaft (SW) is connected via the toothed wheel gear (Z) to the gearbox (GG) and thus it is stopped.

In a middle position (HK0) of the clutch (HK), the operative connection between the variable-displacement gear (HG) and the sun wheel shaft (SW) is interrupted.

In the shifting position (HK2), the previously described reinforcing moment of the sun wheels when the sun wheel shaft (SW) is stopped is absorbed directly and without loss by the gearbox (GG). The efficiency of the transmission improves accordingly in this operating range because of the elimination of the oil leakage power loss of the variable-displacement gear; depending on the operating state, this produces an improvement in efficiency by 2–3%.

The auxiliary clutch (HK), in the middle position (HK0), moreover, offers the possibility of interrupting the operative connection between the hydrostatic variable-displacement gear (HG) and the sun wheel shaft (SW) while the sun wheel shaft is running. In this shifting position as well, the transmission should advantageously be operated such that in the various gear shifting processes after selection of the new gear, instead of shifting out of the old gear that gear is instead left engaged, and the auxiliary clutch (HK) is shifted into the middle position (HK0), as a result of which the hydrostatic gear (HG) is decoupled, and the flow of power through the transmission is purely mechanical, wherupon an improvement in efficiency ensues.

The electronic transmission control system is embodied such that in accordance with the fourth operating mode selection by the driver, by the transmission speed increase the above-described special, low-loss operating mode is established and automatically the corresponding rotational speed ratios in a controlling manner are achieved. Advantageously, depending on the position of the hydrostatic adjusting unit, the next, lowest-loss operating point in succession that the auxiliary clutch possibility offers is established by regulation, and the auxiliary clutch (HK) is coupled in controlled fashion accordingly. In this case again, the signal for carrying out this clutch control process is brought about with the aid of the electric key or switch disposed on the drive lever and described above.

When all the shifting operations of the auxiliary coupling (HK) are fully exploited, the result is accordingly a 16-speed ratio transmission with a continuous variation in the transmission ratio between the speed ratios. At the gear ratio points corresponding to the 16 selectable gears, the power flows purely mechanically and with low loss through the transmission.

Another advantageous application of the auxiliary clutch (HK) is the fast disconnection of the drive train in an emergency or in an automatic association with a full-braking process, particularly if the wheels would otherwise lock, thus averting the danger of racing of the hydrostatic gear (HG).

The auxiliary clutch (HK) is advantageously embodied as a multiple-disk clutch, thus making shifting possible even with torque present.

An advantageous type of control of the transmission, particularly if a Diesel engine is used, comprises, to avoid an overly low engine rotational speed when strong braking forces are exerted, particularly by an actuation of the service brake, in the braking state, is to predetermine a set-point rotational speed of the Diesel engine above the normally selected idling rotational speed. In accordance therewith, the transmission control is then carried out until the appropriate gear, i.e. speed ratio, for the situation has been engaged. However, if for control reasons the transmission cannot change to the appropriate gear fast enough, and the engine rotational speed drops below the normal idling rotational speed, then the group clutches (K6, K7) are disengaged in controlled fashion, and the change of gear, i.e. change of speed ratio, of the transmission is maintained with respect to the normal idling rotational speed until synchronized rotational speed levels prevail at the group clutches (K6, K7), whereupon these clutches are engaged again.

It is also advantageously provided that the transmission control be performed such that even in overrunning, the engine rotational speed does not exceed a specified maximum value.

These transmission rules with respect to obeying the specified maximum and minimum engine rotational speed limits are given higher rank than the other regulating criteria, which are each dictated as a function of the selection of operating mode. Another embodiment of the apparatus in the case of an electrical failure of the control system is that the group clutches (K6, K7) and the gear selection clutches (K1, K5) of the 1st and the 5th gear are each released by the provision that the ⅜-way valves (V1, V5, V6, V7) that trigger them are embodied such that in the currentless state they connect the hydraulic pressure line to the disengagement cylinders.

A fifth advantageous operating mode is made possible by the disposition of the reversing gear (WG) in the mechanical power split part of the transmission. In this fifth operating mode, starting or stopping can be done fully hydrostatically in every selectable gear. In a similar manner to how the hydrostatic power split part can be decoupled by the auxiliary clutch (HK) upon each change of a selectable gear, the mechanical power split part can also be decoupled upon each change of a selectable gear by decoupling the reversing gear, as a result of which decoupling the power flows purely fully hydrostatically through the transmission, and this is exploited in the fifth operating mode.

Table 5 shows the shifting logic to be adhered to if starting or stopping is to be done fully hydrostatically in an arbitrary selected gear range.

This fifth operating mode is realized by providing that upon a preselection of a gear range for starting, the clutch of the gear range preceding the desired starting gear range is engaged in addition to that of the selected gear, and then the hydrostatic gear is adjusted to the power-split mode until the correct shifting point is reached. At the correct shifting point, rotational speed equality prevails at the claw clutch of the reversing gear, and once this is ascertained, a problem-free transition to the clutch coupling configuration typically associated with that selected gear configuration is finally effected, by engaging one of the reversing clutches (KR, KV).

Analogously to this, for a fully hydraulic stopping in an arbitrary selected gear, while shifting down in a gear-changing process, the gear to be typically disengaged is additionally left engaged, and instead the reversing gear clutch is shifted to its neutral position. After that, the hydrostatic gear can be adjusted to the zero position, as a result of which a standstill is attained.

TABLE 5

Fully hydrostatic starting/stopping from the 0 gear to the designated gear

| Gear | KR/KV | K0 | K1 | K2 | K3 | K4 | K5 | K6 | K7 |
|------|-------|----|----|----|----|----|----|----|----|
| 1. |  | X | X |  |  |  | X | X |  |
| 2. |  |  | X | X |  |  | X | X |  |
| 3. |  |  | X | X | X |  |  | X |  |
| 4. |  |  | X |  | X | X |  | X |  |
| 5. | X | X |  |  |  |  | X |  | X |
| 6. |  | X | X |  |  |  | X |  | X |
| 7. |  |  | X | X | X |  | X |  | X |
| 8. |  |  |  | X | X | X |  |  | X |

Table 5 shows only the clutch configurations to be generated during the fully hydrostatic starting and stopping into the designated gear ranges. Switching over to the power-split driving operation is done in each case by engaging one of the reversing clutches (KV, KR) of the reversing gear when rotational speed equality is reached at the respective clutch and the an ensuing disengagement of the clutch associated with the preceding gear range. After that, the following gear ranges can be run through power-split in accordance with the rules given in Table 1 or 2.

Example: starting in the 7th gear:
engage the clutches of the 2nd, 3rd, 5th and the 7th selectable gear (K2, K3, K5, K7);
adjusting hydrostatic gear from 0 to max.
engage a reversing clutch (KV KR); disengage the clutch of the 2nd selectable gear (K2).

At that instant, the seventh power-split gear range is in operation. The possibility of fully hydrostatic starting and stopping in each gear provides increased flexibility in terms of control techniques.

In the electronic transmission control system, the group selection switch (GW1) is for instance expanded with further starting gears, as a result of which a corresponding fifth operating mode can be selected. It can also be specified that automatically beyond a certain intensity of a braking process, as a result of actuation of the drive pedal or service brake, a switchover to the fifth operating mode, namely the fully hydrostatic braking, is initiated in each case; this avoids many shifting processes and avoids having to run through many gear ranges, and faster braking occurs.

We claim:

1. A continuously adjustable power transmission comprising a hydrostatic-mechanical power split gear arrangement by means of a hydrostatic variable-displacement gear (HG), a four-shaft double planetary gear (I, II) and following selectable ratio gears, the power transmission further comprising an input shaft (EW) which is permanently operatively connected via a first spur gear (SG1) to the variable-displacement gear (HG) and which input (EW) can be coupled in a controlled manner to a planet shaft (EP1) of the second of the planetary gears (II) and to the outer wheels (AKI) of the first of the planetary gears (I), the power transmission further comprising an output shaft (KW) of the hydrostatic variable-displacement gear (HG) which is connected via a toothed wheel stage (Z) to a sun wheel shaft (SW), on which the two sunwheels (SRI, SRII) of the planetary gears (I,II) are disposed, the power transmission further comprising a planet shaft (AP1) of the first planetary gear (I) which is connectable in a controlled fashion to a first intermediate shaft (ZW), via a selectable ratio gear and an associated 3rd gear selection clutch (K3), the power transmission further comprising an outer wheel shaft (AP2) of the second planetary gear (II) which can be coupled in a controlled fashion to the intermediate shaft (ZW) via further selectable ratio gears and associated 2nd and 4th gear selection clutches (K2,K4), and the power transmission further comprising a transmission output shaft (ASW) which can be connected to the intermediate shaft (ZW) via a first group gear and an associated first group change clutch means (K6), and which transmission output shaft (ASW) further is connectable to a second intermediate shaft (HW), via a second group gear and an associated second group change clutch means (K7), which second intermediate shaft (HW) can be connected in a controlled fashion to the first intermediate shaft (ZW) by means of a 5th gear selection clutch (K5), characterized in that the second intermediate shaft (HW) can be connected to the planet shaft (AP1) via a 1st selectable gear, by a separately controllable 1st gear clutch (K1), to the planet shaft (AP1);

that the input shaft (EW) is connectable to the planet shaft (EP1) via a selectable reversing gear (WG);

that an intermediate gear (ZG) operatively connected to the sun wheel shaft (SW) can be coupled in controlled fashion to the intermediate shaft (ZW) during a starting operation, via a separately controllable intermediate zero gear clutch means (KO);

that only the clutch means (K4, K5) for the 4th and the 5th selectable gears have synchronizing devices, and all the other clutches (KV, KR, KO, K1, K2, K3, K6, K7) of the reversing gear, of the selectable ratio gears and of the group gears are embodied as simple claw clutches; and that by means of a control system (ST), as a function of signals of operating elements (FH, GP, GH), when leaving the standstill state of the output shaft (ASW) is commanded, the clutches for the 0, 1st and 5th gears (KO, K1, K5) are engaged, and as a function of the position of a group selection switch (GW), one of the group gear clutches (K6, K7) is engaged, and an adjustment of the variable-displacement gear (HG) takes place controlled as commanded, and a transition to a hydrostatic-mechanical split-power operating state is established, in each case when there is a rotational speed equality between the clutch elements of the reversing gear (WG) to be engaged, as a function of the position signal of an up-down counter, by means of actuating the forward clutch (KV) or the reverse clutch (KR) of the reversing gear (WG), and that in the event that the clutch (K6) of the lower group gear is actuated, the single clutch for the 1st gear is kept engaged, until a transition to 6th gear takes place.

2. An continuously adjustable power transmission as defined by claim 1, characterized in that the second intermediate shaft is a hollow shaft (HW), which is supported on the first intermediate shaft (ZW), and all the change clutch means (K0-K5) of the intermediate gear (ZG) and of the selectable ratio gears are disposed around the intermediate shaft (ZW).

3. A continuously adjustable power transmission as defined by claim 1, characterized in that the hydrostatic variable-displacement gear is controllable electrohydraulically; that all the clutches (KV, KR, K0-K7) are controllable by hydraulic actuators via electrically controllable hydraulic valves (VV, VR, V1-V7); and that the program-controlled electronic control system (ST), on its output side, controls the valves (VV, VR, V1-V7) and the hydrostatic variable-displacement gear (HG), and the control system (ST), on its input side, is connected to operating elements (GH, GP, FH, VRW, GWI, BAS, IP, BP), and to rotational speed sensors (S1, S2, SA) disposed on both sides of the variable-displacement gear (HG) and on the output shaft (ASW) and the control system (ST), on its input side, further is connected to position sensors for the various change clutch means (KV, KR, K0-K7), and in that running through a gear range, i.e. speed ratio range, is effected in each case by an adjustment of the hydrostatic variable-displacement gear from one extreme setting to such an opposite extreme setting at which setting, by means of the rotational speed sensor signals of the rotational speed sensors (SI, S2, SA), a rotational speed equality is signalled between the various clutch elements to be shifted of the clutches of a selectable gear subsequently to be engaged or disengaged subsequently.

4. A continuously adjustable power transmission as defined by claim 1, characterized in that by the control system (ST), a preparatory synchronization of the intermediate shaft (ZW) takes place without load, in each case during a passage through the 5th gear range, by means of the synchronizing clutches (K4, K5), wherein upon shifting up, the clutch (K5) of the 5th gear and upon shifting down the clutch (K4) of the 4th gear perform synchronizing work, in that the respective clutch (K4, K5) of the respective preceding 4th or 6th gear not carrying power in the 5th gear range in each case is disengaged first, and subsequently the associated synchronizing clutch (K5, K4) is engaged briefly.

5. A continuously adjustable power transmission as defined by claim 1, characterized in that the static speed increasing ratio of the first planetary set (I) is −4.0, and that the static speed increasing ratio of the second planetary set (II) is −3.0.

6. A continuously adjustable power transmission as defined by claim 1, characterized in that it is built in a vehicle in terms of drive, and its wheel drive is designed such that the travel speeds in the various extreme positions of the hydrostatic variable-displacement gear (HG), at a specified constant, regulated engine rotational speed are 0.84 km/h for the starting range and for the eight gear ranges are 1.39; 2.32; 3.87; 6.45; 10.75; 17.9; 29.9 and 49.8 km/h, respectively.

7. A continuously adjustable power transmission as defined by claim 1, characterized in that the output shaft (ASW) is the summation shaft of a differential gear (DG), the driven shafts (AW1, AW2) of which are connected to driving wheels of a vehicle.

8. A continuously adjustable power transmission as defined by claim 7, characterized in that the differential gear (DG) has a controllable differential lock.

9. A continuously adjustable power transmission as defined by claim 1, characterized in that the control system (ST) controls the transmission speed increasing ratio, forming a control loop, in accordance with the position of an operating mode switch (BAS),
wherein in a first operating mode position, a set-point signal from a position transducer of a drive lever (FH) and an actual signal for the applicable transmission speed increasing ratio are provided from the applicable ratio between the output rotational speed signal (SA) and the input rotational speed signal (S1), and
wherein in a second operating mode position, a set-point signal from a position transducer of a gas pedal (GP) is formed in combination with an accordingly ascertained operating point, specified in an engine performance graph, for a minimum fuel consumption, and an actual signal of the applicable transmission speed increasing ratio is provided from the applicable ratio between the output rotational speed (SA) and the input rotational speed signal (S1), and
wherein in a third operating mode position, a specified engine rotational speed for maximum engine power serves as a set-point signal, and the input rotational speed signal (S1) serves as an actual signal, and
wherein in a fourth operating mode position, a set-point signal is provided by the position transducer of the drive pedal (FH) or of the gas pedal (GP), and the output rotational speed signal (SA) serves as an actual signal.

10. A continuously adjustable power transmission as defined by claim 9, characterized in that as a function of a position of an adjustable signal transducer, the transmission speed increasing ratio, in each case when a difference between the set-point and actual signals occurs, which difference corresponds to a position within a speed range, the hydrostatic gear (HG) is in each case controlled to a neutral position.

11. A continuously adjustable power transmission as defined by claim 10, characterized in that the signal transducer for the neutral position of the hydrostatic gear (HG) is an electric switch mounted on the drive lever.

12. A continuously adjustable power transmission as defined by claim 10, characterized in that disposed on the output shaft (KW) of the hydrostatic variable-displacement gear (HG) is an auxiliary clutch (HK), which is controllable by the control system (ST) and which in a normal position (HK1) establishes the operative connection between the aforementioned output shaft and the sun wheel shaft (SW) via a toothed wheel gear (Z), or which auxiliary clutch (HK) in another shifting position (HK2) connects the sun wheel shaft (SW) to the gearbox (GG) via the toothed wheel gear (Z), stopping the sun wheel shaft, or which auxiliary clutch moved into a middle position (HK0) leaves the aforementioned output shaft and the sun wheel shaft (SW) unconnected and freely rotating.

13. A continuously adjustable power transmission as defined by claim 12, characterized in that the control system (ST), in one of the specifiable operating modes, in each case at a specified setting of a speed range, the auxiliary clutch (HK) is brought into the normal position (HK1), and the variable-displacement gear (HG) is adjusted in its neutral position, and then the auxiliary clutch (HK) is shifted to the other shifting position (HK2) that stops the sun wheel shaft (SW).

14. A continuously adjustable power transmission as defined by claim 12, characterized in that the control system (ST), as a function of a predeterminable control signal for a gear range change, controls the hydrostatic variable-displacement gear (HG) into its closest extreme position at the time and then the control system (ST) engages the clutch of the next gear range, while the clutch of the previous gear range remaining controlled in a connected state, and after that the control system (ST) moves the auxiliary clutch (HK) into the middle position (HK0).

15. A continuously adjustable power transmission as defined by claim 12, characterized in that the control system (ST), as a function of a predeterminable operating mode signal in each specified speed range and as a function of a particular control deviation of the actual signal for reading an applicable lesser control deviation,
either adjusts by control the hydrostatic variable-displacement gear (HG) into its neutral position while the auxiliary clutch (HK) is moved to its normal position (HK1), and then shifts the auxiliary clutch (HK) into the shifting position (HK2) that stops the sun wheel shaft (SW),
or controls the auxiliary clutch (HK) into its normal position (HK1) and then adjusts by control the variable-displacement gear (HG) into its extreme position and in this position controls a shift of the auxiliary clutch (HK) into the middle position (HK0).

16. A continuously adjustable power transmission as defined by claim 12, characterized in that the control system (ST), as a function of a predeterminable control signal that signals a full braking or an emergency situation, controls the auxiliary clutch (HK) into the middle position (HK0).

17. A infinitely adjustable power transmission as defined by claim 9, characterized in that the control system (ST), in the presence of an actuation signal of a brake pedal (BP), continuously compares the input rotational speed signal of the input rotational speed sensor (S1) with a first comparison signal, which corresponds to a set-point rotational speed specified to be higher than a given engine idling rotational speed and in accordance with an applicable deviation therefrom shifts through this decreasingly necessary gear range sequence, and the control system (ST) compares the input rotational speed signal continuously with a specified engine idling rotational speed signal, and whenever the named input signal drops below the named specified signal the control system (ST) controls the group clutches (K6, K7) via the valves (V6, V7) in a decoupling fashion, and after that, by means of a comparison of the input rotational speed measurement signals (S1, S2) with the output rotational speed signal (SA), checks continuously, in accordance with the current selected gear range, whether a synchronous rotational speed is present at one of these group clutches (K6, K7), and if so, the control system (ST) controls that clutch so that it is engaged again.

18. A continuously adjustable power transmission as defined by claim 17, characterized in that the control system (ST) continuously compares the input rotational speed signal (S1) with a specified maximum rotational speed signal, and whenever the latter is exceeded, selects the next higher gear range of the transmission.

19. A continuously adjustable power transmission as defined by claim 1, characterized in that the valves (V1, V5, V6, V7) of the clutches (K1, K5) for the 1st and the 5th gear and of the group clutches (K6, K7) are embodied and connected in such a way that in the currentless state, these clutches (K1, K5, K6, K7) are each disengaged.

20. A continuously adjustable power transmission as defined by claim 1, characterized in that the control system (ST), in a predeterminable operating mode, sets the transmission in a fully hydraulically and not power-split mode, in that it actuates the gear range clutches (K0, K1, K5; K1, K2, K5; K1, K2, K3; K1, K3, K4) of a gear range next lower to a specified gear range and that of the selected gear range and that it actuates one of the group gear clutches (K6, K7) to be simultaneously engaged to the other actuated clutches, and that the control system moves the reversing gear clutches (KR, KV) into the neutral position until it has been signaled that the variable-displacement gear (HG) has been moved into one of the extreme positions and rotational speed equality prevails at one of the reversing gear clutches (KV, KR), whereupon the control system controls this clutch so that it is engaged and controls the nonselected gear of the two engaged gears so that it is disengaged, whereby a transition out of or into the power-split mode takes place, as applicable coming from or slipping to the upper of the two previously engaged ratio gears.

21. A continuously adjustable power transmission as defined by claim 20, characterized in that the control system (ST) is automatically assigned to the fully hydrostatic operating mode, if a braking by an adjustment of the drive pedal (FH) or of an actuation of the service brake (BP) is signalled to the control system (ST), which exceeds a specified braking limit value.

* * * * *